United States Patent
Turner et al.

(10) Patent No.: US 10,346,609 B2
(45) Date of Patent: Jul. 9, 2019

(54) METHOD TO ESTABLISH VIRTUAL SECURITY PERIMETERS

(71) Applicants: James Luke Turner, Raleigh, NC (US); Robert Edward Turner, Huntingtown, MD (US)

(72) Inventors: James Luke Turner, Raleigh, NC (US); Robert Edward Turner, Huntingtown, MD (US)

(*) Notice: Subject to any disclaimer, the term of this patent is extended or adjusted under 35 U.S.C. 154(b) by 1003 days.

(21) Appl. No.: 13/986,899

(22) Filed: Jun. 17, 2013

(65) Prior Publication Data
US 2014/0013433 A1 Jan. 9, 2014

Related U.S. Application Data

(63) Continuation of application No. 12/454,094, filed on May 12, 2009, now abandoned.

(51) Int. Cl.
*G06F 17/24* (2006.01)
*G06F 21/55* (2013.01)
*G06F 21/60* (2013.01)
*G06Q 10/10* (2012.01)

(52) U.S. Cl.
CPC .......... *G06F 21/552* (2013.01); *G06F 17/241* (2013.01); *G06F 21/604* (2013.01); *G06Q 10/10* (2013.01)

(58) Field of Classification Search
CPC ...... G06F 21/55; G06F 21/552; G06F 21/554; G06F 21/50; G06F 21/566; H04L 29/06632
See application file for complete search history.

(56) References Cited

U.S. PATENT DOCUMENTS

| | | | | |
|---|---|---|---|---|
| 6,088,796 | A * | 7/2000 | Cianfrocca | G06F 17/3089 707/999.009 |
| 6,396,400 | B1 * | 5/2002 | Epstein, III | G06F 21/86 340/540 |
| 7,779,463 | B2 * | 8/2010 | Stolfo | G06F 21/552 380/59 |
| 2001/0039579 | A1 * | 11/2001 | Trcka | G06F 21/552 709/224 |
| 2002/0046275 | A1 * | 4/2002 | Crosbie | G06F 21/552 709/224 |

(Continued)

*Primary Examiner* — Esther B. Henderson

(57) ABSTRACT

A method to establish virtual security perimeters for classified electronic documents on a computer system. The security perimeters are based upon a full classification determination of all informational content of an electronic document file. The full classification determination is uniquely coded to identify a classification value, the classification regime used to classify the information as well as ownership of the electronic information of the electronic document, and is embedded in the electronic document. The classification determination code is matrixed with identification codes for elements of a file management system and used to control computer events initiated on a computer involving the electronic document. Computer events on computers are monitored for the coded full classification determination. The code scheme is also used to identify a breach of a security perimeter on a computer of an unauthorized classified electronic document and warning of the breach.

37 Claims, 8 Drawing Sheets

(56) References Cited

U.S. PATENT DOCUMENTS

| | | | | |
|---|---|---|---|---|
| 2003/0188189 A1* | 10/2003 | Desai | .................... | H04L 63/145 |
| | | | | 726/23 |
| 2005/0132166 A1* | 6/2005 | Saffre | .................... | G06F 21/577 |
| | | | | 712/26 |
| 2005/0144467 A1* | 6/2005 | Yamazaki | ........... | H04L 63/0227 |
| | | | | 713/189 |
| 2006/0272024 A1* | 11/2006 | Huang | .................... | G06F 21/55 |
| | | | | 726/26 |
| 2009/0158441 A1* | 6/2009 | Mohler | ................ | G06F 21/552 |
| | | | | 726/27 |
| 2010/0251369 A1* | 9/2010 | Grant | .................... | G06F 21/554 |
| | | | | 726/23 |

* cited by examiner

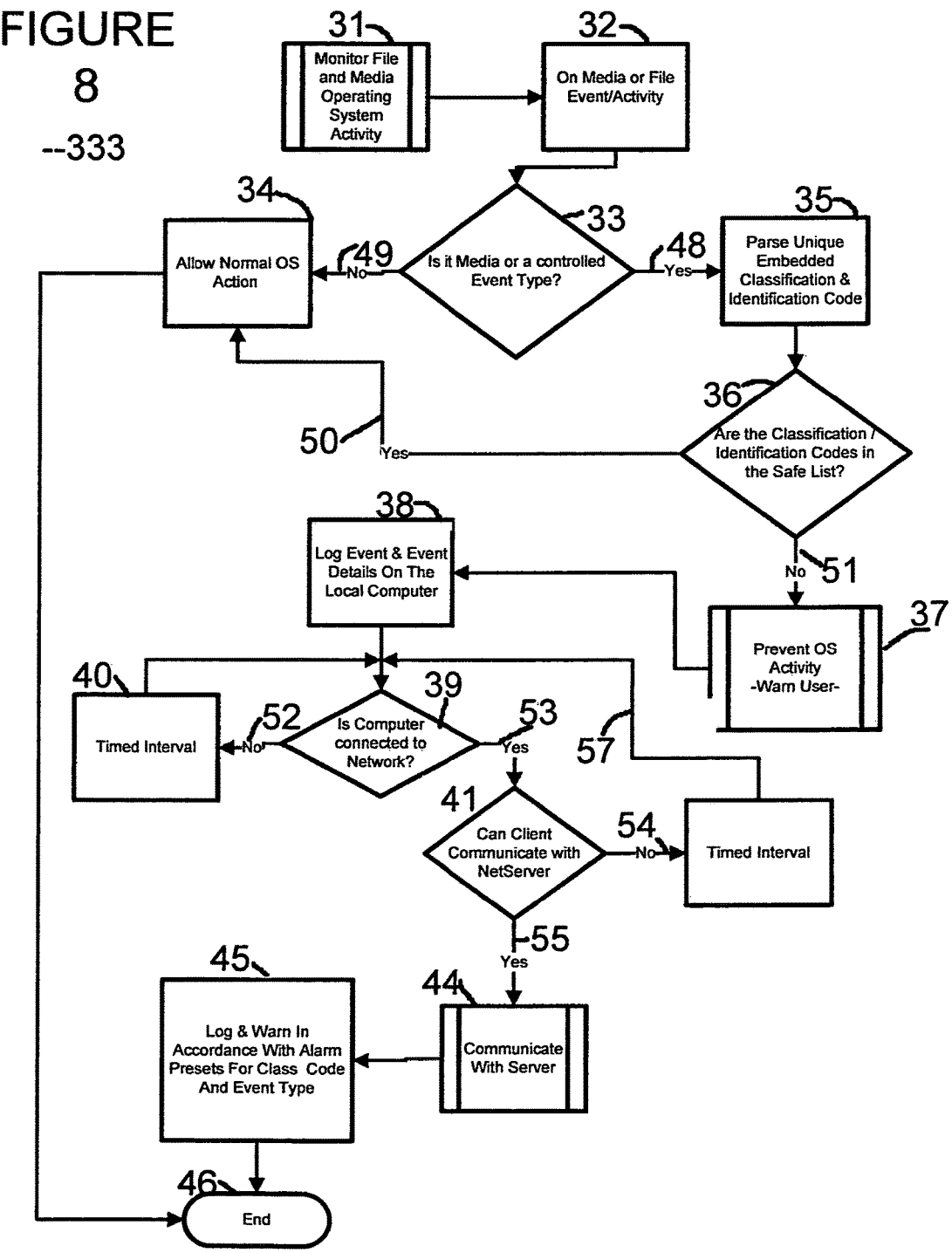

METHOD TO ESTABLISH VIRTUAL SECURITY PERIMETERS

CROSS-REFERENCE TO RELATED APPLICATIONS

This application is a continuation of U.S. Ser. No. 12/454,094, filed May 12, 2009, which claims priority from U.S. provisional application No. 61/127,385, filed May 13, 2008 which are hereby incorporated by reference in their entireties. As well as application U.S. Ser. No. 11/520,857, filed Sep. 13, 2006, all applications filed by inventors James Luke Turner and Robert E. Turner.

STATEMENT REGARDING FEDERALLY SPONSORED RESEARCH OR DEVELOPMENT

The current patent development and submission involved no federal funds or sponsorship.

REFERENCE TO SEQUENCING LISTING, OR COMPUTER PROGRAM LISTING COMPACT DISK APPENDIX

Not Applicable

THE TECHNICAL FIELD OF THE INVENTION

The present invention relates to the identification, classification, marking, protection and control of sensitive, personal or proprietary information as well as sensitive or national security classified government information hereinafter referenced as "classified" in its electronic document form on a computer, computer network or among computer networks as well as the appropriate classification and marking of derived hard copy forms of an electronic document's informational content. It also relates to:

- The complete and reliable classification assessment of all information contained in an electronic document regardless of the attributes assigned to the information by document development software applications or the users of such document development software applications. Attributes such as but not limited to whether or not the information text is visible to the user or hidden, not viewed by the user.
- The association of an electronic document's complete classification of all informational content to unique non-text based codes persistently embedded in a document's electronic shell.
- The reliable association of all information contained within an electronic document to unique classification codes corresponding to text classification determinations in an information classification regime for computers, networks of computers, and domains of networks.
- The establishment of reliable security access controls for electronic documents/information based upon a document's or storage media's associated complete or full classification code(s), as well as similar unique classification regime code assignments to the security clearance level or access authority of users of the network; to elements of a computer operating system's file management system on a computer; to computers on a network; to networks and to domains of networks in real-time.
- The establishment of document/information "Need to Know" or authorized access controls to electronic documents/information for computer or network system users, based on the complete classification determination of all information contained in an electronic document with representative unique classification codes persistently embedded in a document's electronic shell, in relation to user security clearance level or access profiles within a specific sensitivity or classification level for electronic documents matrixed and resident on, or associated with a computer network or domain of computer networks.
- The establishment and configuration of positive and reliable real-time controls relating to the movement and/or storage of classified or sensitive electronic documents/information on or across computers, computer networks and domains of networks and associated electronic document storage media.
- The establishment/configuration of virtual, electronic security perimeters among computers or computer networks based on the complete, unique and persistent classification or sensitivity codes for electronic documents/information enabling positive document access, movement and other document/information security controls.
- The process and method of continuous real-time security verification of physical security perimeters among computer networks or domains of computer networks that separate different levels of sensitive or classified electronic documents/information to include unclassified documents/information on computers, computer networks or domains of networks for the purpose of protecting information.

The invention's processes and methods to reliably obtain the full or complete classification determination for an electronic document as well as embedding and associating unique codes in the electronic shell of a document representing the complete classification determination, provides a reliable basis for further methods and processes of the invention to control document movement, access and storage of electronic documents within classified or sensitive computers, computer networks or domains of networks as well as methods and processes to identify and immediately alert on a security breach by an electronic document or its storage media of a physical security perimeter between computers, computer networks or domains of networks operating at different sensitivity or classification levels without compromising or otherwise providing insight into the individual classification regimes resident on computers, networks or domains of computer networks operating at the higher classification or sensitivity level.

BACKGROUND OF THE INVENTION

This patent application provides further separate innovation and utility of methods and processes set forth in pending Utility patent application Ser. No. 11/520,857. The creation of computer systems, networks of computers, and associated software that allow for the movement of sensitive and/or classified documents within and among computer networks has by its very nature reduced the rigor of document security control as it was applied in previous paper document/information control systems. "Need to Know" determinations essential to information security control in paper based access control systems for national security classifications have been suspended for electronic documents/information developed, moved/transmitted and stored on computer systems and networks of computer systems in lieu of alleged productivity gains. The productivity attributes of document development software applications have compounded this document/information security problem by providing hard copy output generation or other electronic output views of the information contained in electronic documents, that may not reflect the full content of the information contained in an electronic document, and thus may not reflect the full sensitivity or national security classification of the information contained in the electronic document, thereby subjecting the document/information to possible mishandling and/or compromise.

The productivity gains of computers, computer networks, and document development software, have led to the development of sensitive and classified computer networks without sufficient methods for positive identification and persistent and consistent feedback for the developer/user of an electronic document of all possible information in the electronic document as well as the lack of developer/user capability to assign or determine corresponding sensitivity or classification designation for the informational content of the entire electronic document. This significant shortcoming has resulted in lack of positive controls at the document level to adequately control access to information in electronic document format within a physical security perimeter set for a sensitive or classified network or domain. In addition, current security processes and software to control information in electronic documents do not provide adequate assurance and verification and alerting capabilities to determine that the information is not breaching physical security perimeters among networks or domains of networks, approved for different levels of sensitive or classified information. In addition to these short comings, The capability to store huge numbers of documents/information on portable media devices, the ease of transferring information between or among computers, and the practice of close physical proximity of computers of differing classification and/or sensitivity levels to enhance user productivity, multiply the potential risk and damage associated with lack of positive security control of documents/information resident within security perimeters established for computers or networks of computer.

Recent inventions that provide user assurance of appropriate national security or sensitivity classification assessment and classification determinations for information in electronic documents, persistent document marking capability for electronic documents, and the association of unique classification codes embedded in the document's electronic shell, have not fully accounted for the information classification problem associated with productivity features found in most document development host software applications. The ability to provide comments or notes within a document or to hide text/information in an electronic document or it's electronic shell, as well as the ability to provide application or user driven subset views of the information contained in an electronic document are some typical document development software application features that may mislead a user's understanding or ability to ascertain the full or complete classification or sensitivity value of the information contained within the total electronic document and may cause the mishandling or compromise of information contained in an electronic document. Currently, user's of electronic document files are unable to determine a classification or sensitivity distinction between a subset view of the informational content of a document generated by a document development software application that they may be handling and the full or complete classification determination of the all the information regardless of the application attributes, visible, hidden, etc, assigned to information contained in the document. The ability of document originators, subsequent authors of a document, as well as subsequent systems users that may develop and or subsequently use or move electronic document information on computer systems and computer networks to know the full sensitivity or classification value of an electronic document is of critical importance to assuring and enforcing complete control of sensitive or classified information.

Similarly, automated means and software programs designed to control access to electronic document information or to control the movement or storage of electronic documents in real-time require positive, and persistent means to determine the full classification value of the information contained in the total electronic document in order to be effective. Control systems based on document/information sensitivity and classification determinations that do not account for the full or complete sensitivity or classification potential of the information contained in an electronic document have ineffective control structures and establish potential systemic or "programmed-in" vulnerabilities into the control systems for electronic documents. The current state of developing, processing and disseminating sensitive and/or classified electronic information for stand-alone computers, networked computers and domains of networks is piecemeal, relying on disparate, text based sensitivity determinations on possible subset informational or "print" views of the electronic document to identify sensitivity or national security classification, and provide ineffective security control of the movement of, and access to, sensitive and/or classified electronic documents/information on computer networks.

Such control systems have not accounted for the potential to overlook portions of the content of an electronic document that may change the value of the document's sensitivity or classification. As an example, most modern word processing and document development software provides the capability for Comments, Notes, Hidden Text, etc to be established in a document's electronic file. However, the user must select to view such information by specifically selecting controls in the application to view that information. Failure to view or account for such potentially hidden information when classifying a document as to it's sensitivity or national security designation may lead to catastrophic miss-classification of the document/information and have a ripple effect for subsequent users of the document that rely on the text classification marks of the "print" view of the document to determine how to appropriately disseminate, move or store an electronic document on a computer network. The productivity gains of computers and computer networks as well as associated communication capability to transmit electronic document information exacerbate this information control problem.

In addition, subsequent users of such documents may be mislead by subset views provided by modern document development software applications of the information contained in an electronic document which may result in false assumptions of the classification value of the displayed or subset information, resulting in mishandling of the electronic documents as well as mishandling printed views of the subset information. For example, a user may receive an electronic document whereby comments made by a previous user of the electronic document were not assessed and/or classified by the previous user. The comments inserted into the electronic document are of a higher classification value and require additional protection than the classification marking for the electronic document when displayed without the comments being visible. The subsequent user elects to display comments in his/or her view of the information contained in the electronic document. The subsequent user prints that view of the electronic document not realizing that the information contained therein is improperly classified and marked. In addition to an improperly marked hard copy of the information, the second user unknowingly forwards the electronic document to another user on the network who is not authorized to have access to the information contained in the comments, thereby compromising the information.

Document development and dissemination software has also led to multiple computers, possibly representing multiple networks, side by side on users desks at different levels of sensitivity or classification without sufficient capability to alert security personnel to breaches or spills of information, whether intentional or inadvertent, among the various systems.

Compounding these systemic flaws, there currently is little positive and accurate control and tracking over the access to and the movement of such information within the security perimeters of authorized computer networks or among authorized network domains. As a result, Government and businesses are grappling with intentional insider threats and perimeter breaches to sensitive and classified information on their systems, as well as inadvertent disclosures from their systems that compromise protected critical or national security classified information.

Attempts at text-based controls for sensitive and classified information have been ineffective due to false negatives as well as false positives, and their inability to adequately handle compilation classification designations as well as the inability to handle graphics and other modern features of computer document development software.

In order for electronic document security to be effective new methods are needed to assure that the classification process assesses all potential information, both visible and hidden, contained within an electronic document, that both the classification of the complete electronic document file, as well as the classification of the current output view of the document are available, dynamic, persistent and apparent to users of the electronic document file in real-time, and that electronic document/information dissemination, movement, access and media storage controls are based on the full classification value of the information in a document.

The present invention by means of full and complete value classification determinations of all information contained in an electronic document, as well as the use of persistent, unique codes to represent the full classification determination in the shell of an electronic document, provides a positive basis for effective controls for electronic documents, as well as the establishment of meaningful virtual electronic perimeters that are based on positive, and reliable identification of an electronic document's full value sensitivity or classification.

In the instant invention the methods and processes established to ensure full value user classification determinations of all the information contained in electronic documents and the assignment and registry of unique representative classification coding combine to enable additional methods and processes to:

1. Identify, positively and reliably, the full sensitivity/classification of all information in an electronic document to system/application users;
2. Provide positive and immediate methods with which to control access to electronic documents to authorized system users;
3. Control, positively and reliably, the movement of electronic documents on a network operating in a multi-level classification mode;
4. Identify, positively and reliably, a breach of a physical security perimeter between computers, computer networks or systems of computer networks operating at different levels of sensitivity or classification, without compromising or providing unnecessary insight into the classification criteria, or sensitive program designations.

Any software firm that produces document security control software needs to make their product line more effective in sensitive and classified information network environments. Any government or government sponsored entity authorized to classify or handle national security classified information needs more effective security software for computers and networks.

Needs exist for new and positive methods of identifying and assuring the proper classification of all information contained in an electronic document in real-time. Needs exist for positive feedback to users of host document development applications to ensure that they know the full classification level of an electronic document so that they can properly protect the information in accordance with the standards of their organization, or law. Needs exist for methods of real-time positive security controls for electronic documents based on reliable and persistent full classification determinations of all information contained in the electronic document without compromising sensitive programs or classification criteria, to control and protect electronic documents/information on computer networks, as well as provide the capability of alerting security personnel to breaches of physical security perimeters among networks at different levels of classification or sensitivity.

SUMMARY OF THE INVENTION

The processes and methods of the present invention provides additional significant utility to recent advances in methods to enable computer or computer network users to assess and to classify information contained in electronic documents by means of an assistance interface that identifies document portions and provides a point and click classification determination process, and associates the text based classification determination with unique codes representing the sensitivity or classification level determinations for information contained in a document and embedding the codes in the shell of an electronic document, as well as assuring persistent classification marks for electronic documents in viewed or printed output. The present invention improves the positive and unique, non-text based codes that are imbedded in a document's electronic shell, unique codes that correspond to a document's sensitivity or classification. The invention is a method to ensure that a system user assesses and classifies all information contained in an electronic document, assuring that a classification determination has been made for each portion of the informational content of an electronic document to include portions of information that may be hidden from view of the classifier or subsequent users of an electronic document and thereby missed or not considered for it's classification value. The invention's methods work dynamically in conjunction with host document development software to provide the classifier or subsequent users of an electronic document with visible, positive classification mark determinations for both the full or complete informational content of an electronic document as well as providing dynamically in real-time the classification value of any informational subset view of the document that may be displayed by means of features in document development software applications.

The methods of the invention not only assures a full and complete classification determination that includes all information contained in an electronic document and positively and persistently displays that classification text within the host application's display, but it also assigns a unique classification code to represent the text classification determination for the total information content of the electronic document and embeds the unique code in the electronic shell of the document in a reliable and persistent manner. The invention further provides methods for the System Security Administrator (SSA) for a computer network to develop and initiate reliable, virtual changeable perimeter controls that manage a document's movement or access within, or among computer networks, based on the coded classification value of the full or complete document content, assigning and assuring proper access control at the document, subfolder, folder, drive, or volume level of document electronic storage. The invention's methods also improves previous methods of electronic document control by establishing the capability to assign and code "Need to Know" access lists to an electronic document for additional access control within national security classification designations. "Kneed to Know" document access lists become reliable in the electronic environment as a result of the invention's methods to reliably ascertain the full or complete classification content of documents/information electronic format in real-time.

The invention uses the same unique; non-text based coding capability within the document's electronic shell to control whether or not documents of specific sensitivity or classification may cross network domains for dissemination, access and document control on computer networks of other network domains. The invention provides a software interface that allows the SSA to setup the criteria and controls based on the full sensitivity or classification of information contained in electronic documents that may need to be disseminated or controlled on other authorized computer network or domains. The unique coding scheme which can enable a unique classification code set for each domain enabling the SSA to identify the organizational ownership of documents that may have crossed computer network domains and reliably provide consistent tracking, control and oversight capabilities based on the full content classification of an electronic document and the unique, organizationally specific, representative code.

By means of the reliable full classification of a document's information content and the unique and persistent coding capability within a document's electronic shell, as well as the unique coding capability and assignment associated with storage media that contain classified and/or sensitive documents/information, the present invention also provides methods to immediately and accurately identify a breach of physical security perimeters. This aspect of the invention is a method that is established and resident on a computer, computer network or system of networks that "watches" for and/or senses specific unique classification codes that occur in the documents electronic shell, or are imbedded on document storage media that are not authorized on the receiving computer, network of computers or domain of networks. The unique classification codes that represent text based classification determinations allow the invention's methods and processes to be resident on computers not authorized to receive the text based information and to function on unclassified or lower classified computers without compromising or allowing unnecessary insight into the text based classification regime of higher level classification computers.

The inventions methodology immediately alerts the SSA to physical breaches of the security perimeter established for the computer, network or system of networks, providing positive identification of the breach, level of the beach, time, date, user and other information important to the remedy. The unique codes associated with the full classification of an electronic document's information and persistently imbedded in the document's electronic shell allow for the establishment of positive "monitoring" capability on computers or networks of lower classification authority, without compromising the text value of the classification, where the text value or the fact that such information exists on the higher level network is in itself sensitive or classified information.

The persistent embedded unique codes in a document's electronic shell that represent a complete classification determination of all information of an electronic document enable the invention's positive and dynamic virtual perimeters within a computer, network or domain of computer networks to:

1. Control access to document information;
2. Control the movement and storage of documents; and
3. Provide alerts, warnings or statistical information on attempts to circumvent or breach virtual perimeters.

These and further and other objects and features of the invention are apparent in the disclosure, which includes the above and ongoing written specification, with the drawings.

BRIEF DESCRIPTION OF THE DRAWINGS

FIG. 8 is a process flow chart for a positive method to control access to electronic documents/information, control the movement and storage of electronic documents/information, and provide virtual, dynamic, electronic security perimeters based upon persistent and complete document/information classification code(s) in the document's electronic shell within protected networks.

DETAILED DESCRIPTION OF THE PREFERRED EMBODIMENTS

Figure 1:
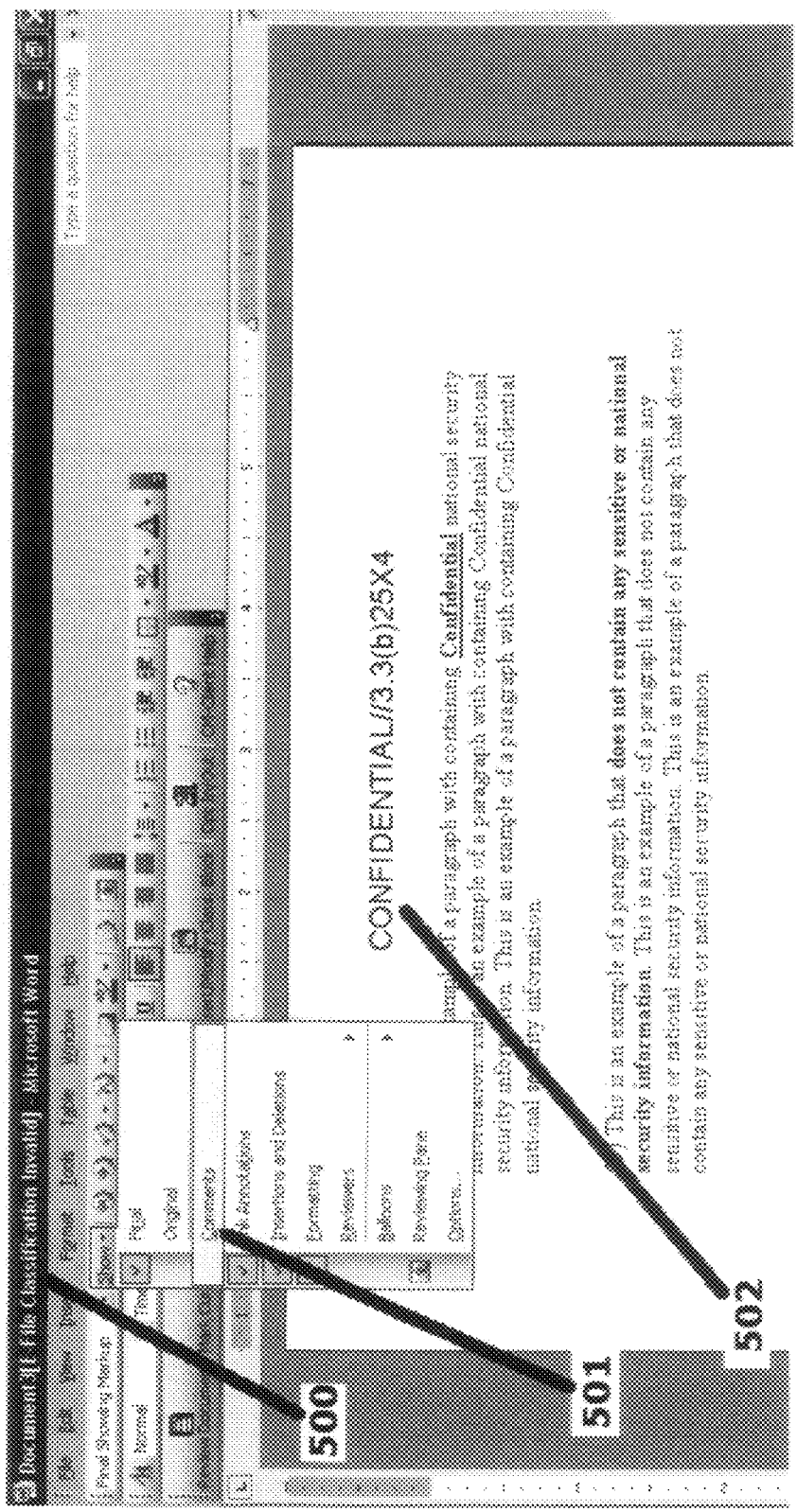
FIG. 1 shows a difference in classification between the full document information content versus the current view of information content in document development software represented by Microsoft Word™ application.

The present invention is a process and method enhancement for an automated assistance system used to completely identify, mark, control, track and otherwise protect the sensitive and/or classified information of an organization when that information is in electronic document format on computers or computer networks.

The present invention is an enhancement of a software classification engine method and process that runs in a compatible mode with "off-the-shelf" word processing, e-mail, presentation, spread sheet or other document development software. The invention is a process and method to assure the proper assessment and classification of all information, both visible and hidden, that may be contained in an electronic document to establish the complete or full classification determination in electronic format before the document or changes to the content of the document are committed to electronic format. The invention, via the host document development software application user/document interface, provides dynamic. persistent visual and readable total classification determination status to the document developer/classifier and/or subsequent users of an electronic document ensuring that users of the electronic document have sufficient knowledge of the full classification value of the informational content of an electronic document for proper secure handling of the electronic or digital information in accordance with the rules and regulations of the organization to protect the information.

By means of the process and method for obtaining a complete classification determination and embedding a corresponding, unique and persistent classification code in the electronic shell of the document, the invention provides the proper basis for positive control of the electronic document regarding its movement, storage location and access on a computer, computer network or computer domain without compromising classification determination criteria which may itself be classified or sensitive when in a readable text format.

Accordingly, the invention's assurance of complete, persistent, and unique codes representing document classification or sensitivity determinations in the document's electronic shell provides the basis to establish proper virtual perimeters to the computer file level on or among computers, computer networks and domains of networks to provide proper control of the movement or storage of the documents. It also provides the basis for proper methods for real-time virtual controls based on user authorized access levels to allow or prevent system user access to documents/information based upon user access authorization codes and the full classification determination.

The invention's assurance of complete, persistent classification or sensitivity codes in a document's electronic shell provides the basis to positively warn or alert when a document has breached a physical perimeter established to protect information on a computer, network or domain of higher classification or sensitivity, by any means of file or media transfer across a physical perimeter to a computer, network or domain not authorized for the document/information.

FIG. 1 demonstrates a possible national security classification determination difference between a document's working view and the full classification of all information elements for a document in a typical host document development software application 500. The full classification determination for the document, "[e-file classification invalid]" 500 is presented to the application user in the host application banner. The classification determination for the current application view of the document, "Confidential//3.3 (b) 25×4" 502 is displayed in the headers and footers in the view. The difference in the classification determinations in this instance alerts the user that information elements of the electronic document not visible in the current view of the document have not been classified in accordance with the organizations requirements for national security classified or sensitive information. A drop down list shows that "comments" has not been selected to be visible in the user's view 501. The ability of the invention to dynamically interact and assess in real-time the classification status of all informational elements of the electronic document within the host document development application and to provide user information as to the classification or sensitivity of the current view versus the full document classification or sensitivity status, provides assurance to the document user on how to properly safeguard the information in the electronic document, versus the information displayed or printed from a subset view of the information contained in an electronic document.

Figure 2:
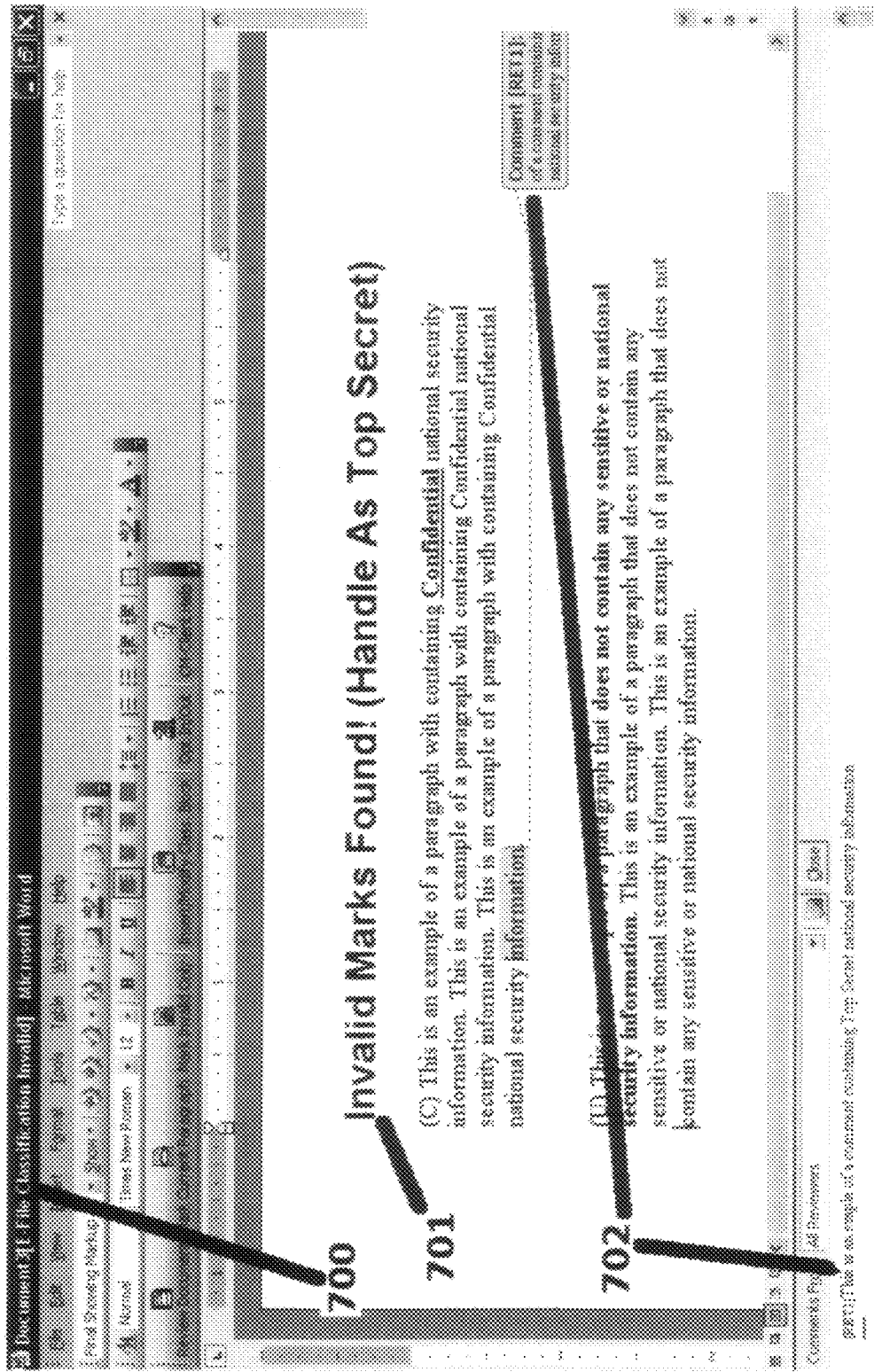
FIG. 2 shows the result of displaying all document informational content in the current view of the document and how the classification of the view dynamically changes in document development software represented by Microsoft Word application based on the informational content and classification value of the specific or selected view of the information.

FIG. 2 demonstrates the dynamic process or methods of the invention when the host application view shown in FIG. 1 is changed to display "comments" 702 in the view. The full classification determination for the document, "[e-file classification invalid]" 700 is presented to the application user in the host application banner and remains unchanged from that shown in FIG. 1 500. However, because informational elements of the electronic document that have not been classified are now visible in the new view of the information contained in the document 702 and subject to print activity, the classification determination for the current document view or potentially printed document as reflected in the headers and the footers within the view of the document 701 change to reflect the appropriate organizational designation for information that is not fully classified "Invalid Marks Found (Handle As Top Secret)" 701. The dynamic interaction in real-rime of the process and method of the invention within the classification engine with the host application provides the classification assurance of the document's informational view, displayed or printed, and provides accurate information to the user for proper safeguarding of the information.

Figure 3:
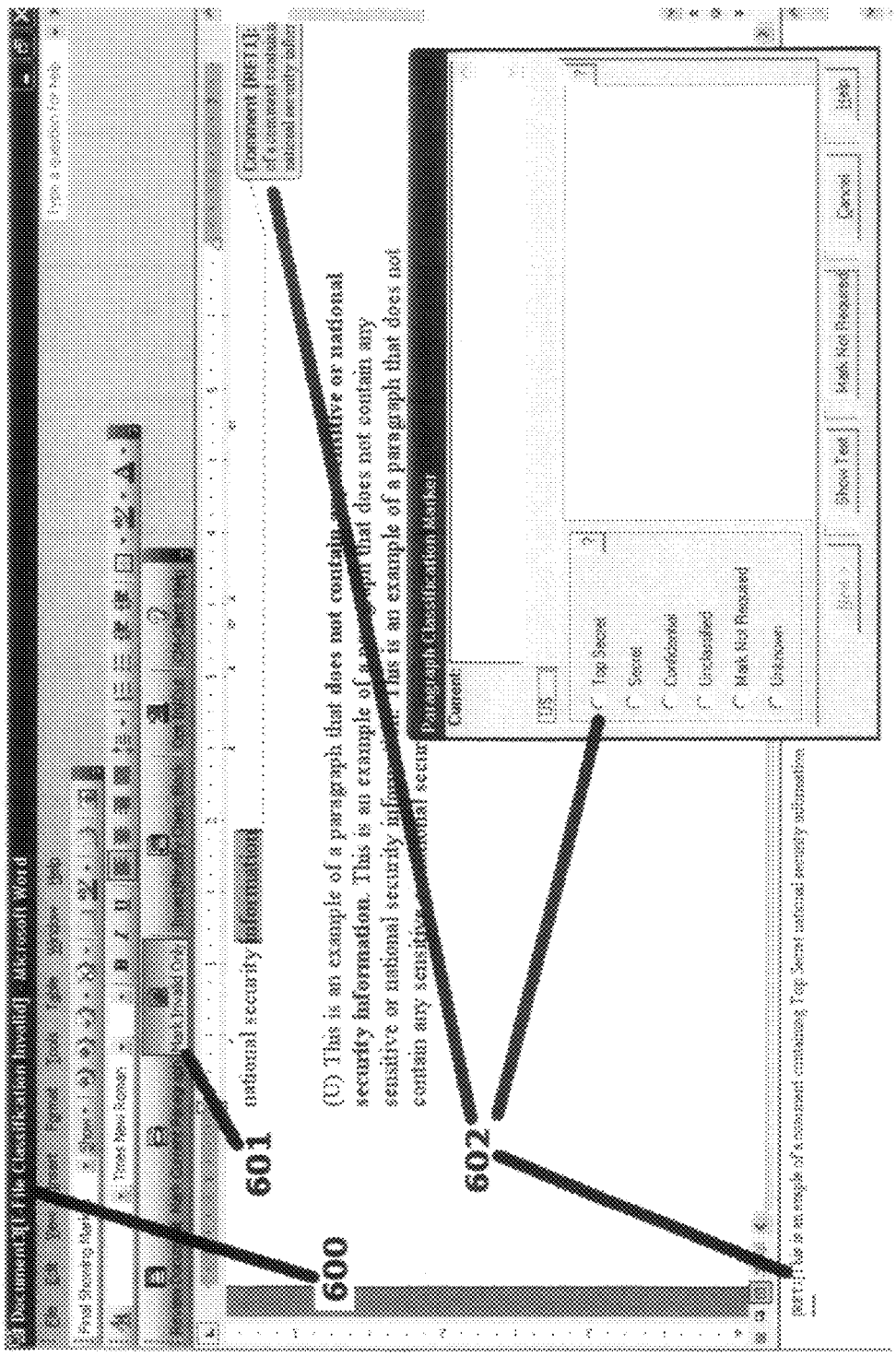
FIG. 3 shows the process of the invention enhanced classification engine identifying un-assessed information in a document and presenting the information to the user for a classification determination in document development software represented by Microsoft Word application.

FIG. 3 is a follow on to the process demonstrated and shown in FIG. 2 and shows the invention enhanced classification engine identifying an un-assessed, and previously hidden, informational element of the document "comment" 602 for a classification decision by the user/classifier. The un-assessed and unmarked information in the comment 602 is identified via the invention's is enhanced classification engine process Button "Mark Invalid Only" 601. However until the classification determination is made for the unclassified information element "comment" 602, the complete or full document classification designation as set forth in the application banner "[e-file classification invalid]" 600 remains unchanged.

Figure 4:
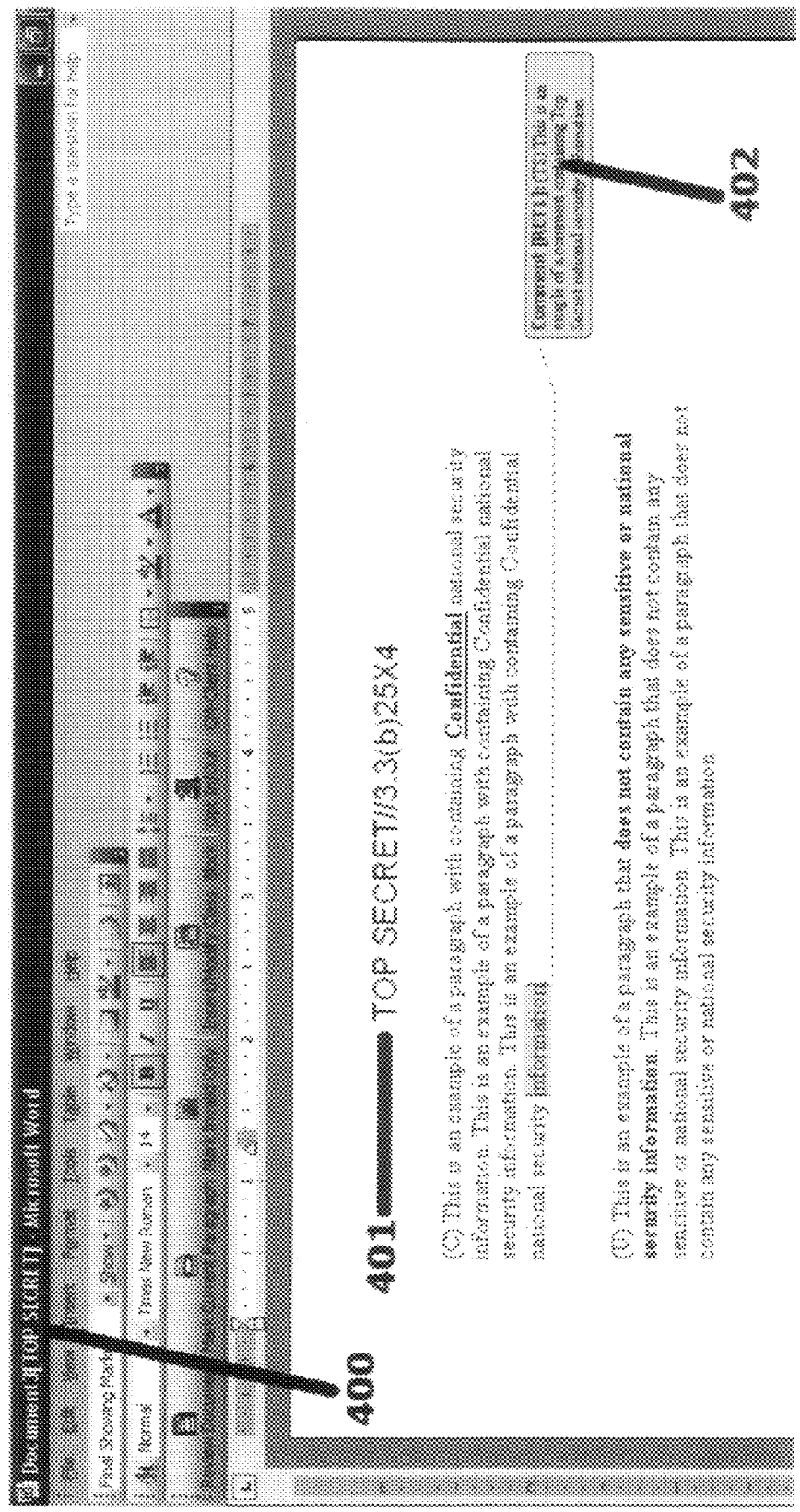
FIG. 4 shows the effect in the document development application's banner for the document as well as the document's complete informational view when all document informational elements have been assessed and classified by the invention's enhanced classification engine in document development software represented by Microsoft Word application.

FIG. 4 is a follow on to the process shown in FIG. 3 and demonstrates the effect of the invention's enhanced classification engine when all informational elements of the document have been assessed and classified by the user/classifier. In FIG. 4 the "comment" has been classified as "Top Secret" by the user/classifier 402. The invention's enhanced classification engine determines that all informational elements have been assessed and classified in the document's view and applies the appropriate classification designation in real-time to the header and footers of the documents current view 401 or potential printed document. The full classification determination for information contained within the electronic document, "[Top Secret]" 400 is presented to the application user in the host application banner and it is consistent with the current view 401 of the document because all informational elements of the document are displayed in the documents current software view of the host application and all informational elements have been assessed and classified.

Figure 5:
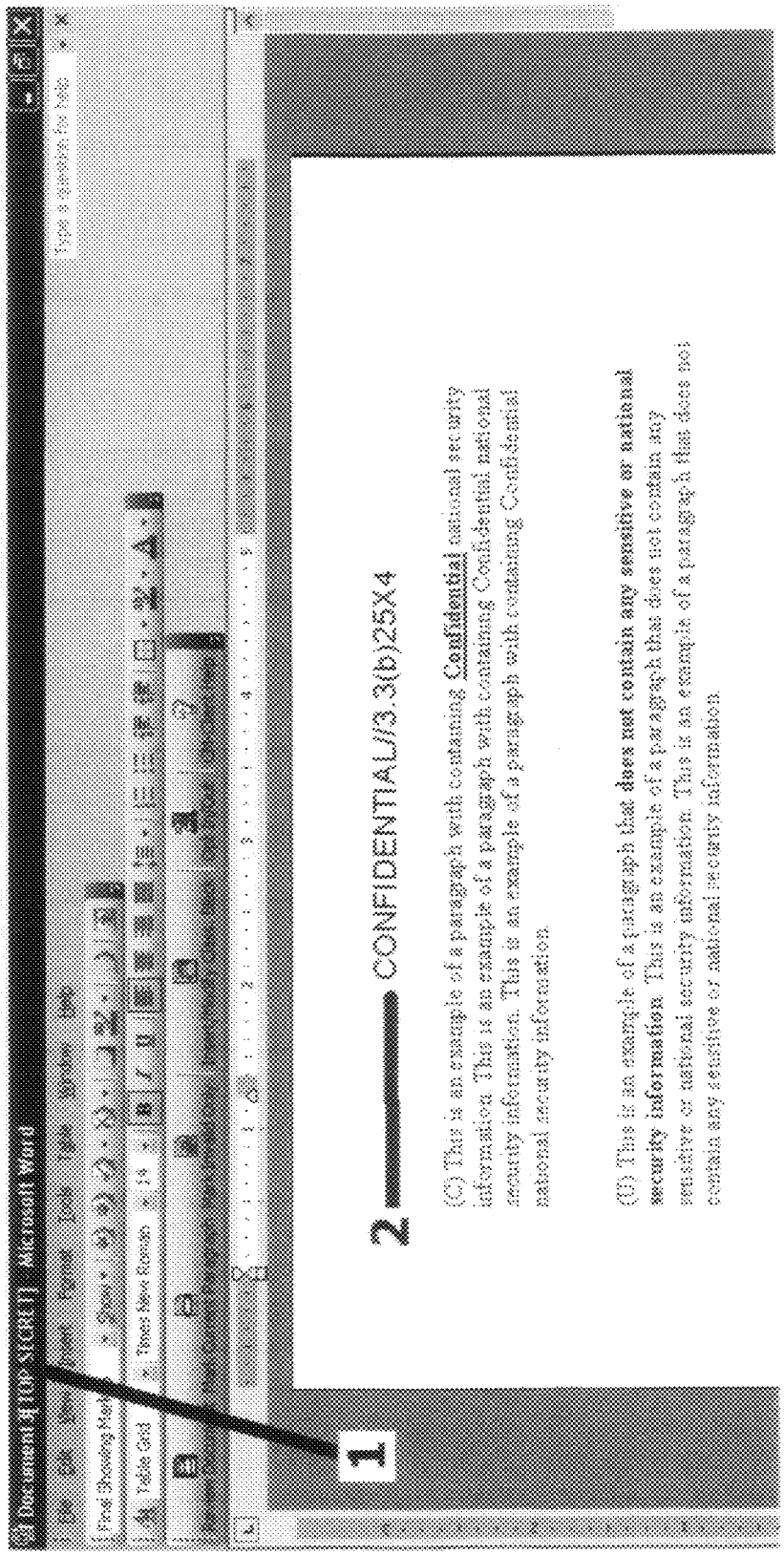
FIG. 5 shows the effects of the invention's enhanced classification engine display of the classification result of the current incomplete view of the document's information by the application versus the display of the complete document classification within the application banner in document development software represented by Microsoft Word application.

FIG. 5 is a follow on to the process shown in FIG. 4 and demonstrates the dynamic effect of the invention's enhanced classification engine when comments that are classified Top Secret are not part of the selected or subset view 2 of the informational elements of a document and are hidden from the view of the user by the host application. The invention's enhanced classification engine dynamically establishes in real-time the proper classification designation of the elements of the current document display, or printed form, and applies and displays the appropriate text classification designation, "Confidential/3.3(b) 25×4", in the headers and footers of the subset view 2. However, because an informational element within the electronic document is not contained in the current subset view of the document's information, in this case a comment previously classified as "Top Secret", the full classification determination for the information contained in the electronic document is, "[Top Secret]" 1 is presented to the application user in the host application banner by means of the invention's enhanced classification engine.

The invention's process and method of dynamically presenting in real-time two classes of document classification information to the user, (1) the full or complete classification consisting of all of the informational elements of an electronic document, and (2) the classification of the current or selected view of an electronic document displayed and/or printed. These two classes of classification information provides assurance that the user has all of the necessary information to properly safeguard the information contained in the electronic document as well as the current displayed view or printed hard copy of the document. Thereby the invention's enhanced software classification engine prevents user assumptions about the classification of an electronic document serving to prevent inadvertent compromise due to unrecognized safeguarding requirements possibly associated with a higher classification level for the full informational content of an electronic document as opposed to a potential subset of that information displayed in the current or user selected view of a document within the host document development application. Conversely, the dynamic real-time interaction of the modified classification engine to re-establish the appropriate classification of information in a subset view of a document's information assures that the appropriate classification for the view is displayed and/or printed, preventing over classification or under classification/control of the information.

In addition to the complete text classification determination being persistently and obviously displayed in the banner of the host document development application, the invention's enhanced classification engine sets in real-time a unique code(s) that represents the full text classification determination into the electronic shell of the document, and records the complete classification information about the document, date, author, path etc in a relational database. The database can be used to establish historical information on the document and the classification state of the information contained therein in real-time. The database can also be used to assure that the classification code embedded in the document is correctly reestablished if the code(s) is removed from the electronic shell by a user outside of the host application. The invention's methods will sense that the classification code is missing from the document's electronic shell and will reinstall the complete classification code based on the information contained in the database for the document. The invention's method will also warn security personnel in real-time of an apparent attempt to manipulate a document's classification outside of the document's host application software. These methods of the invention provide for the persistent nature of the classification codes embedded in the documents shell.

The invention's real-time, complete or full and persistent classification code(s) embedded in the document's electronic shell provides a real-time basis to positively, and reliably control the movement, storage and access to documents/information in accordance with its full classification or sensitivity level in accordance with the information protection rules or requirements of an organization.

Figure 6:
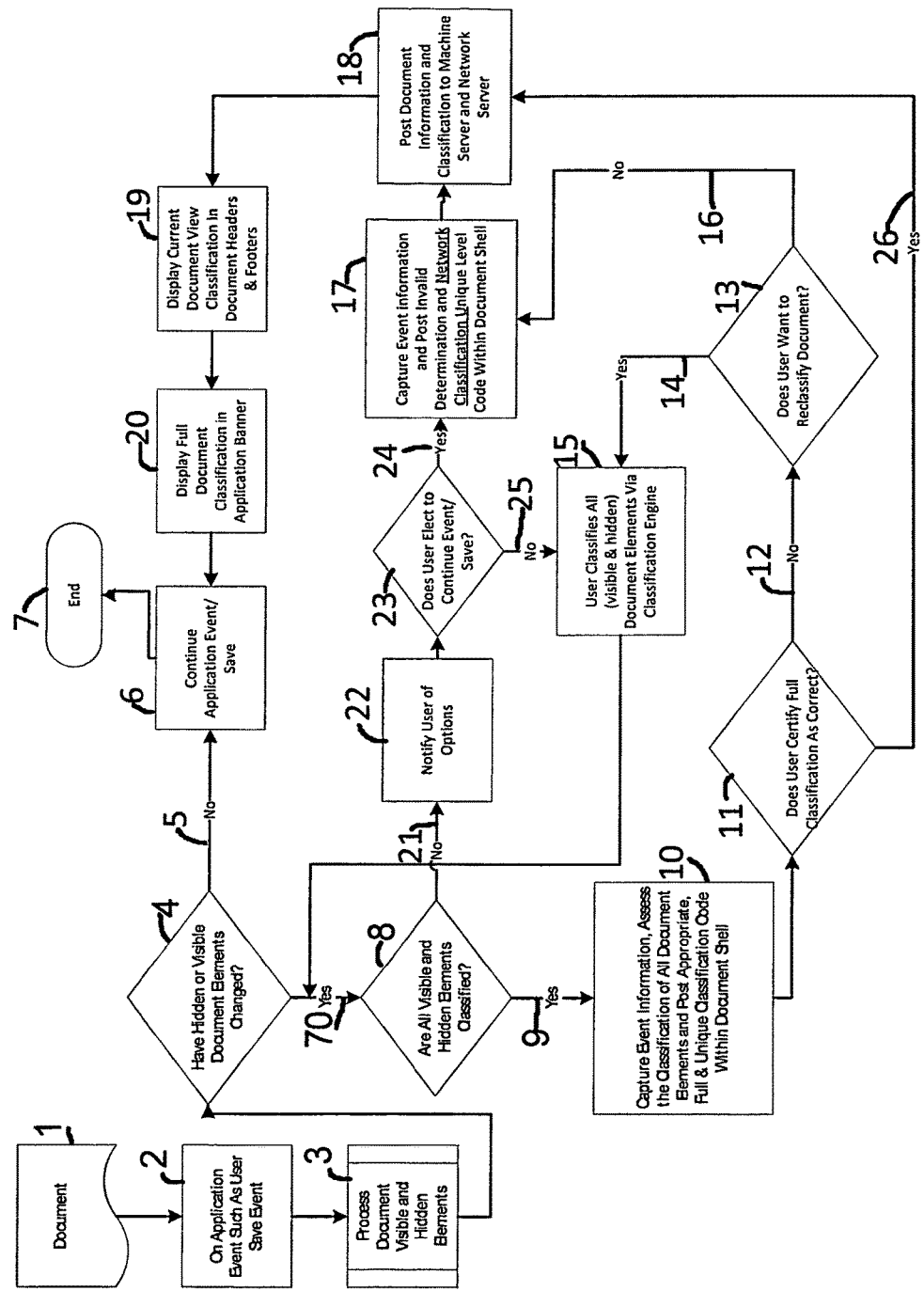
FIG. 6 is a process flow chart for a method to determine, capture, and uniquely code, the full or complete national security classification or sensitivity of information contained in a document, and persistently embed the unique classification determination or sensitivity code in the electronic shell of a document and display the resultant full classification determination of the document/information in the application banner for the document.

FIG. 6 is a simplified flow chart 111 of one possible embodiment of a process or method of the present invention to reliably establish a complete or full classification determination for the complete informational content of an electronic document that may contain hidden information or information not in the current view of the user. The process monitors the host document development application events 2 that would produce a changed or new electronic file/document 1. When such an event is identified 2 then all visible and hidden informational elements of the document are processed to determine if they have changed 3. If they have not changed 5, then the normal application event is allowed to continue 6 and the process ends 7. However, if the informational elements of a document are new or have changed 70, then the process assesses all visible and hidden document informational elements to determine if they are all properly assessed and classified 8. If they are not properly classified 21, the process visually notifies the application user that the document is not properly assessed, classified and marked, requesting the user to elect to either classify those document elements 25 or to continue the application action in the document's improperly classified state 24. If the User elects to continue the application action in the improper classification state 24, the process captures the activity in a centralized relational database, posts an "invalid" designation to the text classification for the complete classification determination in the host application's banner and appends to the text designation a network handling instruction designated for such improperly classified documents and the entire text classification string is posted within the host application banner, as well as posting the unique code for an improperly classified document to the document's electronic shell and the relational database 17. The process then posts appropriate document information to the machine or computer server relational database and then posts the same information to the network server relational database. 18. The invention's methods assess the classification status of the informational elements of the current host software view of the document and displays the current classification of the current view of the information contained in the document 19 and then the inventions methods assesses and displays the complete classification determination for all of the documents informational elements, in the host applications banner 20, then the application's normal event processing is allowed to continue 6 and the process ends 7. However should the user elect to properly classify the document elements that have not been assessed and classified 25, then the enhanced classification engine identifies those elements and allows the user to select in real-time a classification for each such element 15. The process ensures that all elements have been assessed and classified 70 and if they have all been assessed and properly classified 9, the process assesses the classification of each element, visible and hidden, and establishes the unique, full classification code for the document in its electronic shell 10. The user is visually provided the text equivalent of the complete classification code for the document and asked to certify that the classification is correct 11. If the user certifies that the document classification is correct 26, the process then posts appropriate document information to the machine or computer server relational database and then posts the same information to the network server relational database. 18. The process displays the current classification of the current view of the information contained in the document 19 within the current view and then the process displays the complete classification determination for all of the documents informational elements, in the host applications banner 20, then the host application's normal event processing is allowed to continue 6 and the process ends 7. However if the user elects not to certify 12, the process determines whether or not the user/classifier elects to re-classify the document elements 14, if the user elects to re-classify the document, the classification process of the documents elements repeat 15. If the user does not want to re-classify the elements of the document 16, then an "invalid" classification determination is posted with the network handling instructions for invalidly classified documents 17 and the process then posts the appropriate unique document classification information to the document's electronic shell, the machine or computer server relational database and then posts the same information to the network server relational database 18. The process dynamically displays the current classification of the current view of the information contained in the document within the current view of the document 19 and then the process dynamically displays the complete classification determination for all of the documents informational elements, in the host applications banner 20, then the applications normal event processing is allowed to continue 6 and the process ends 7.

The assurance of a full or complete classification determination for all information, visible or hidden, contained in an electronic document, coupled with the real-time, persistent embedding of a unique code within the documents electronic shell that faithfully represents the text based classification determination of the information enables further aspects of the invention. The dynamic, real-time incorporation into a document's electronic shell of machine readable unique codes that reflect the complete classification of document information, as well as persistent unique identification codes on document storage media for electronic documents provides a basis for a positive and reliable solution to identify and alert or inform network security administrators that a breach of a physical security perimeter between computers, networks of computers or domains of computer networks authorized at different national security or sensitivity levels has occurred. Because the classifications are uniquely coded, and not text based, the classification or sensitivity levels that are not authorized to reside on a computer, computer network or domain of computer networks can be resident on those systems to identify a physical breach without the potential to compromise the text based classification determination for classified programs or access levels that may in themselves be sensitive and or classified. In addition the unique, complete classification or sensitivity codes imbedded in a document and into document storage media provide near absolute assurance that there will be no false identification of a physical perimeter breach that could occur with text based classification searches.

Figure 7:
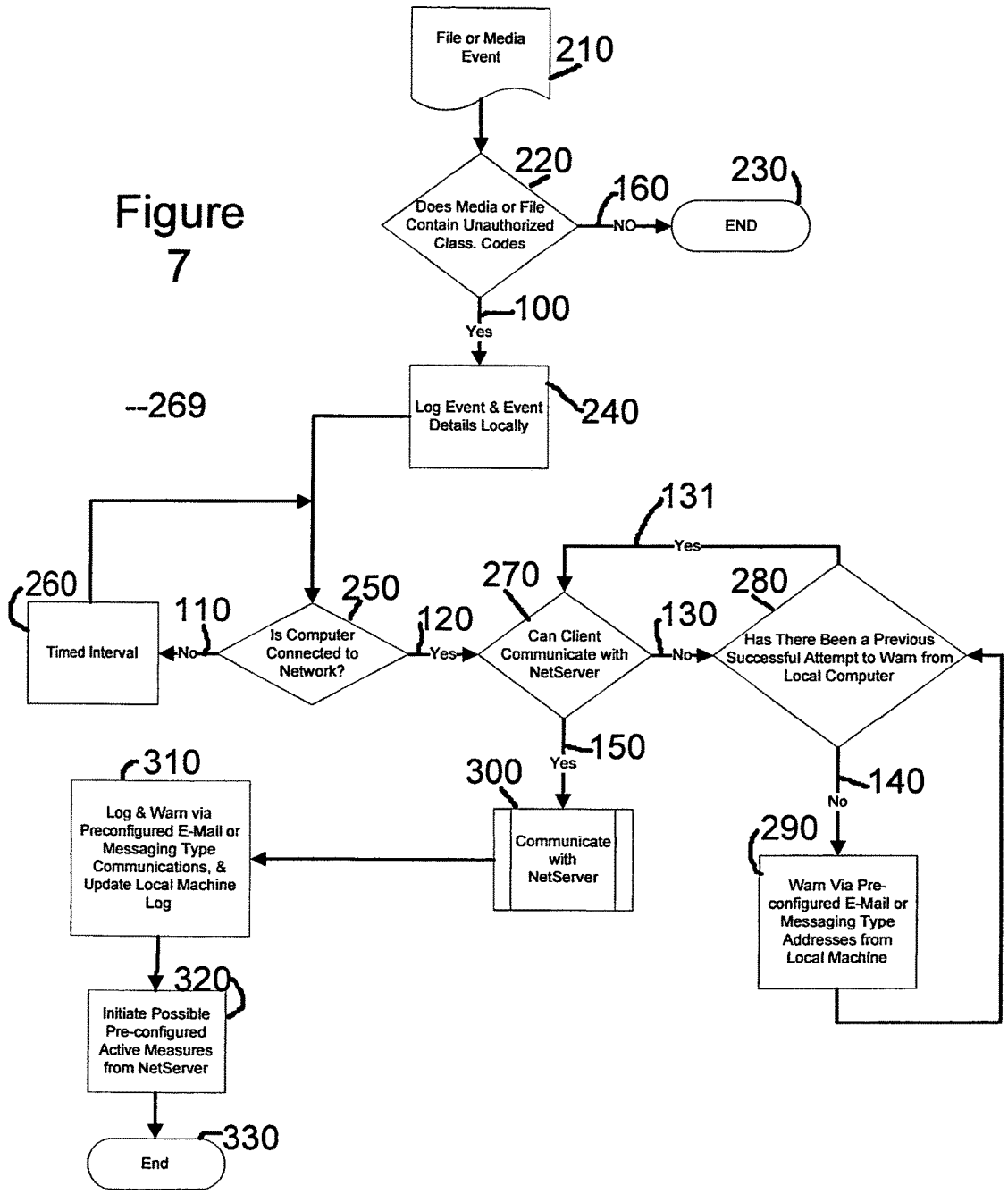
FIG. 7 is a process flow chart for a method to positively identify and warn that a physical network security perimeter has been compromised by the unauthorized movement of classified or sensitive information across the perimeter based upon persistent and complete document/information classification code(s) in the document's electronic shell.

FIG. 7 is a simplified flow chart 269 of one possible embodiment of a process of the invention to identify and alert or warn of physical perimeter breaches by an electronic document(s) or information. The process shown in FIG. 7 unlike the process shown in FIG. 8 is resident on computers, networks, devices, or domains of networks not authorized for the classified document content and are outside of the physical perimeter securing classified or sensitive information. The process monitors file or media events of the systems operating system 210 and 220, or document development host application events of software applications that may be resident on an operating system. On a file or media event 210 the invention evaluates the embedded classification or sensitivity codes of documents and or media introduced to the system 220. If the file or the media does not contain unauthorized classification or media codes 160 then the process ends and the initial file or media event is completed. However if the invention detects an unauthorized classification or media code 100 then the process of the invention logs the event and details of the event such as user, time, date, classification level code, IP address, etc to a local database log on the computer where the breach occurred as well as implementing any pre-configured active measures for the local computer 240. The invention then determines if the computer is connected to a network 250. If the computer is not connected at that time the invention provides a timed interval loop 110, 260, 250 that repeats until the computer connects to the network 120. The invention then determines if the invention can communicate with the server side of the client server invention via the network. If the invention is unable to connect to its network server 130, the invention determines if there has been a successful attempt to warn the pre-determined security or administrator personnel for the system from which the unauthorized information or media originated 280. If there has been no such successful warning via e-mail or messaging or other possible methods of internet/network communications 140, then the invention attempts to issue a warning to the predetermined personnel 290 until such communication has been successful 131. The invention will then loop 270, 130, and 131 until the invention is able to communicate with the network server portion of the invention 150. The invention then communicates the locally logged information 240 with the inventions network server 300 and logs the information on a predetermined network computer database, initiates pre-configured alerts and warning communications to individuals responsible for the security of the information/documents or media that have breached the physical perimeter via e-mail, messaging or other communication methods from the inventions network server 310. The inventions network server then initiates possible pre-determined active measures such as but not limited to, freezing the identified user's network accounts on both the lower classified system as well as the higher classified system that he or she may have access, downloading and initiating software to record key strokes of the identified user, or disabling the functionality of the computer that now hosts the unauthorized information/document, or media, or isolating the computer from the network, etc 310. The process ends 330 but the initiating file or media event may not be completed depending on the additional set of active measures that may be initiated 320.

The invention's assurance of real-time full or complete classification determination for information, visible or hidden, contained in an electronic document, and real-time persistent codes embedded in the documents electronic shell that uniquely represent a text classification determination enables further aspects of the invention. Having machine readable unique codes that reflect the complete classification of a document, as well as having persistent unique identification codes on document storage media for electronic documents provides a positive solution to control the movement, storage or access to classified and/or sensitive information in electronic format on or among computer networks or computer domains. In effect the controls equate to virtual perimeters for documents/information on computers, networks or among domains of networks at the file level based on the sensitivity or classification of the information contained in the document, the type of operating system event, the predetermined storage authority for media and/or the security clearance or access profile of the system user. The authorities for these elements are pre-determined in a matrix and the invention enhanced classification and monitoring engine is able to allow or prevent activities based on reliable, persistent and complete or full classification determinations. In this aspect of the invention, the reliable, unique, persistent and complete classification coding embedded in the electronic shell of a document or embedded on document storage media enable the invention to establish dynamic electronic perimeters to control the electronic access to or movement of classified or sensitive information. By means of the enhanced classification aspect of the invention, which establishes a complete classification of all information, whether visible or hidden, for a document, and the unique embedded classification codes that represent text based classification determination—for example "Top Secret//Special Access Required/Blue Dog/Red Dog/Noform13.3 (b) 25×2" classification my be represented by the invention's modified classification engine as {BC3C66FE-35D2-44EE-954F-61C0A34ACF1}{CB30C677-D35F-FF23-BC25-BBC24BA12E89}{556B329C-25AB-4312-AAB9-BC34A237CC9}{7B954CC2-FF34-673B-8CCA-BB3C4C67AAB}{F2B45CCA-BB34-23FF-5649-23FCA2B789F}{2CA34B64-CB56-234F-935A-FCA34B23C98} and embeds the codes in the electronic shell of the document. The invention by means of testing for certain codes in the documents electronic shell can relate the presence or absence of codes to an action matrix maintained on the inventions network server, thereby, imposing positive controls or dynamic perimeters to allow or prevent operating system or host application events or activity for the document/information across a network or among networks or domains of networks without the potential of compromise of the text based classification determination, which may in itself be classified and or sensitive. The invention's capability to log document access or document movement or attempts by users to initiate such actions provides additional methods and processes of the invention to warn or alert security personnel to attempted operating system or application software events that are pre-determined to pose possible serious security risk to the information/document.

FIG. 8 is a simplified flow chart 333 of one possible embodiment of the aspect of the invention to control documents and information via dynamic security perimeters within a network or domain of classified or sensitive networks. The invention monitors file, media operating system events 31, and on event activation 32 determines whether or not the activity involves file storage media or if the event is a controlled event 33. If the activity is not on the controlled list or does not involve document storage media 49 the operating system event is allowed to be completed normally 34. If document storage media is involved in the event or the event is on the controlled event list 48, then the process parses the unique classification and identification codes in the document's electronic shell and/or document storage media and determines if the classification and/or media codes are in a safe or approved list for the operating system event 36. If all of the codes are on the safe or approved list 50, then the event is allowed 34. However if one or more codes are not on the safe list for the operating system 51, the invention prevents the completion of the operating system event and visually warns the system user that the event will not be completed because the complete classification or the sensitivity determination for the document/information prohibits the operating system activity 37. The invention logs the event on the local computer database 38. The invention then determines if the local computer is connected to the network 39 and continues to make this check via a timed loop 52, 40, 39 until a network connection is made 53 and then the invention determines if the invention can communicate with its network server via the network connection 41. It continues to check via a timed interval loop 54, 57, 39, 53, 41 (possibly in combination with loop 52, 40, 39) until communication with the invention's network server is established 55, 44. The invention's network server logs the event information, updates the local computer log that a connection to the invention's network server has been accomplished, and warns pre-defined network security or administrative personnel based on pre-set conditions of the matrix based on event type, user clearance or access profile, complete or full classification determination for the information, document storage media identification code, etc.

While the invention has been described with reference to specific embodiments, modifications, variations of the invention may be constructed without departing from the scope of the invention.

We claim:

1. A computer-implemented method to identify on a computer system outside of a security perimeter for classified information a breach of said security perimeter of said classified information in electronic format, said method comprising:

(a) executing a classification software engine on at least one computer system authorized for said classified information, where said classification software engine comprising:
      (1) establishing at least one unique code on said at least one computer system for said classified information authorized for said at least one computer system, where said at least one unique code uniquely identifies said classified information authorized for said at least one computer system, and
(2) embedding said at least one unique code into at least one electronic storage media of said at least one computer system, thereby establishing a security perimeter for said classified information authorized for said at least one computer system,
(b) executing a classification software engine on at least one computer system not authorized for said classified information and outside said security perimeter for said classified information, where said classification software engine comprising:
(1) establishing said at least one unique code as a non-authorized said at least one unique code for said at least one computer system not authorized for said classified information and outside said security perimeter for said classified information,
(2) monitoring a computer event of said at least one computer system not authorized for said classified information and outside said security perimeter,
(3) detecting said non-authorized said at least one unique code within at least one electronic storage media involved with said computer event, where a detected said non-authorized said at least one unique code identifies a breach of said security perimeter for classified information on said at least one computer system not authorized for said classified information and outside said security perimeter, and
(4) warning a predetermined entity of said breach of said security perimeter with information about said breach.

2. The method of claim 1, wherein said at least one unique code comprising a classification regime code, where said classification regime code uniquely identifies an information security classification regime for classified information, where said classification regime code is embedded into at least one element of a computer network authorized for said classified information, thereby establishing a security perimeter for classified information for said at least one computer system authorized for classified information communicating with another said at least one computer system authorized for classified information on a network.

3. The method of claim 1, wherein said establishing said at least one unique code, further comprising providing an administrative interface to generate said at least one unique code for an element of an information security regime for classified information.

4. The method of claim 1, wherein said at least one unique code comprising a classification code, where said classification code uniquely represents a classification determination for information resident on said at least one electronic storage media within said security perimeter, where said classification code is generated from an information security classification regime for said at least one computer system authorized for classified information, and where said classification code represents said classification determination for at least one element of a file management system of said at least one computer system authorized for said classified information.

5. The method of claim 1, wherein said at least one unique code comprising at least one classification code, where said at least one classification code uniquely represents at least one element of an information security classification regime for electronic information on said at least one computer system within said security perimeter.

6. The method of claim 5, wherein said at least one classification code further uniquely identifies said information security classification regime for a network of said at least one computer system authorized for said classified information within said security perimeter.

7. The method of claim 1, wherein said at least one unique code further comprises a coding scheme that is unique to an organizational ownership of said classified information residing on said at least one computer system authorized for said classified information within said security perimeter.

8. The method of claim 1, wherein said computer event comprising an operating system event on said at least one computer system outside said security perimeter.

9. The method of claim 1, wherein said computer event comprising a document development application event on said at least one computer system outside said security perimeter.

10. The method of claim 1, wherein said warning comprising at least one of:
(a) an email,
(b) a text message, or
(c) an on-screen notification.

11. The method of claim 1, wherein said embedding said at least one unique code into said at least one electronic storage media, said at least one unique code is embedded into an electronic shell of an electronic document resident on said at least one electronic storage media.

12. The method of claim 1, wherein said non-authorized said at least one unique code is detected, further comprising logging said computer event and details of said computer event.

13. The method of claim 1, wherein said non-authorized said at least one unique code is detected, further comprising initiating at least one active measure for said at least one computer system outside of said security perimeter.

14. The method of claim 13, wherein said at least one active measure comprising at least one of:
(a) freezing a network user account,
(b) recording keystrokes,
(c) disabling said at least one computer system not authorized for said classified information and outside of said security perimeter, or
(d) isolating said at least one computer system not authorized for said classified information and outside of said security perimeter from a second computer system, and
(e) displaying a persistent screen message warning of said breach.

15. The method of claim 1, wherein said establishing at least one unique code on said at least one computer system authorized for classified information, further comprising providing an administrative interface to setup said at least one unique code for at least one element of an information security classification regime for said at least one computer system authorized for said classified information.

16. A computer program product stored on non-transitory storage media to identify on a computer system outside of a security perimeter for classified information a breach of said security perimeter for said classified information in electronic format, said computer program product comprising at least one non-transitory storage media for electronic information, where said at least one non-transitory storage media for electronic information comprising at least one software classification engine, where said at least one software classification engine contains computer usable instructions comprising:
(a) establish at least one unique code on at least one computer system authorized for classified information, where said at least one unique code uniquely identifies said classified information authorized for said at least one computer system,
(b) embed said at least one unique code into at least one non-transitory storage media for electronic information within said at least one computer system authorized for said classified information, thereby establishing a security perimeter for said classified information authorized for said at least one computer system,
(c) establish said at least one unique code as a non-authorized said at least one unique code on at least one computer system not authorized for said classified information and outside of said security perimeter,
(d) monitor a computer event of said at least one computer system outside said security perimeter,
(e) detect said non-authorized said at least one unique code within a non-transitory storage media for electronic information involved with said computer event for said at least one computer system not authorized for said classified information, thereby identifying a breach of said security perimeter for said classified information,
(f) warn a predetermined entity of said a breach of said security perimeter for said classified information with information about said breach.

17. The method of claim 1, wherein said detecting said non-authorized said at least one unique code, further comprising parsing multiple said at least one unique code into a single code and comparing each said single code to each said non-authorized said at least one unique code on said at least one computer system outside said security perimeter.

18. The method of claim 4, wherein said at least one element of a file management system comprising:
(a) an electronic storage media,
(b) a volume on said electronic storage media,
(c) a folder within said volume, and
(d) an electronic document within said folder.

19. A system to identify on a computer system outside of a security perimeter for classified information a breach of said security perimeter of said classified information in electronic format, said system comprising:
(a) at least one computer system where said at least one computer system comprising at least one non-transitory storage media for electronic information, where said at least one non-transitory storage media for electronic information comprising at least one software classification engine, where said at least one software classification engine contains computer usable instructions comprising:
    (1) establish at least one unique code on said at least one computer system authorized for said classified information, where said at least one unique code uniquely identifies said classified information authorized for said at least one computer system,
    (2) embed said at least one unique code into at least one non-transitory storage media for electronic information of said at least one computer system, thereby establishing a security perimeter for said classified information authorized for said at least one computer system,
(b) at least one computer system not authorized for said classified information and outside said security perimeter, where said at least one computer system comprising at least one non-transitory storage media for electronic information, where said at least one non-transitory storage media for electronic information comprising at least one software classification engine, where said at least one software classification engine contains computer usable instructions comprising:
    (1) establish said at least one unique code as a non-authorized said at least one unique code for said at least one computer system not authorized for said classified information and outside said security perimeter for said classified information,
    (2) monitor a computer event of said at least one computer system not authorized for said classified information,
    (3) detect said non-authorized said at least one unique code within at least one-non-transitory storage media for electronic information involved with said computer event, where when detected said non-authorized said at least one unique code is identifies a breach of said security perimeter for said classified information on said at least one computer system not authorized for said classified information and outside said security perimeter for said classified information, and
    (4) warn a predetermined entity of said breach of said security perimeter for said classified information with information about said breach.

20. The system of claim 19, wherein said at least one unique code is comprising a classification regime code, where said classification regime code uniquely identifies an information security classification regime for classified information where said classification regime code is embedded into at least one element of a computer network authorized for said classified information, thereby establishing a security perimeter for classified information for said at least one computer system authorized for classified information communicating with another said at least one computer system authorized for classified information on a computer network.

21. The system of claim 19, wherein said establish said at least one unique code, further comprising an administrative interface to generate said at least one unique code for an element of an information security classification regime for classified information.

22. The system of claim 19, wherein said at least one unique code comprising a classification code, where said classification code uniquely represents a classification determination for information resident on said non-transitory storage media for electronic information within said security perimeter, where said classification code is generated from an information security classification regime for said at least one computer system authorized for said classified information, and where said classification code represents said classification determination for at least one element of a file management system of said at least one computer system authorized for said classified information.

23. The system of claim 19, wherein said at least one unique code comprising at least one classification code, where said at least one classification code uniquely represents at least one element of an information security classification regime for electronic information on said computer system within said security perimeter.

24. The system of claim 23, wherein said at least one classification code, further uniquely identifies said information security classification regime for a network of said at least one computer system authorized for classified information within said security perimeter.

25. The system of claim 19, wherein said at least one unique code, further comprising a coding scheme that is unique to an organizational ownership of said classified information residing on said at least one computer system authorized for said classified information residing on said at least one computer system authorized for said classified information within said security perimeter.

26. The system of claim 19, wherein said computer event comprising an operating system event on said at least one computer system outside said security perimeter.

27. The system of claim 19, wherein said computer event comprising a document development application event on said at least one computer system outside said security perimeter.

28. The system of claim 19, wherein said warning comprising at least one of:
   a. an email,
   b. a text message, or
   c. an on-screen notification.

29. The system of claim 19, wherein said embedding said at least one unique code into said at least one non-transitory storage media for electronic information, said at least one code is embedded into an electronic shell of an electronic document resident on said at least one non-transitory storage media for electronic information.

30. The system of claim 19, further comprising logging said computer event and details of said computer event where said non-authorized unique code is detected.

31. The system of claim 19, further comprising initiating at least one active measure for said at least one computer system not authorized for said classified information and outside of said security perimeter, where said non-authorized at least one unique code is detected.

32. The system of claim 31, wherein said active measure comprising at least one of:
   d. freeze a network user account,
   e. record keystrokes,
   f. disable said at least one computer system not authorized for said classified information and outside of said security perimeter, or
   g. isolate said at least one computer system not authorized for said classified information and outside of said security perimeter from a second computer system, and
   (h) display a persistent screen message warning of said breach.

33. The system of claim 19, wherein said establishing at least one unique code on said at least one computer system authorized for said classified information, further comprising providing an administrative interface to setup said at least one unique code for at least one element of an information security classification regime for said at least one computer system authorized for said classified information.

34. The system of claim 19, wherein said detecting said non-authorized said at least one unique code, further comprising parsing multiple said at least one unique code into a single code and comparing each said single code to each said non-authorized said at least one unique code on said at least one computer system not authorized for said classified information and outside said security perimeter.

35. The system of claim 22, wherein said at least one element of a file management system comprising:
   (a) non-transitory storage media for electronic information,
   (b) a volume on said non-transitory storage media for electronic information,
   (c) a folder within said volume, and
   (d) an electronic document within said folder.

36. The method of claim 2, wherein said at least one element of a computer network comprising:
   (a) a computer system,
   (b) a domain,
   (c) an electronic storage media,
   (d) a volume on said at least one electronic storage media,
   (e) a folder within said volume, and
   (f) an electronic document within said folder.

37. The system of claim 20, wherein said at least one element of a computer network comprising:
   (a) a computer system,
   (b) a domain,
   (c) an electronic storage media,
   (d) a volume on said at least one electronic storage media,
   (e) a folder within said volume, and
   (f) an electronic document within said folder.

* * * * *